O. C. RIXSON.
FRICTION STAY.
APPLICATION FILED JAN. 20, 1916.
1,225,359.
Patented May 8, 1917.
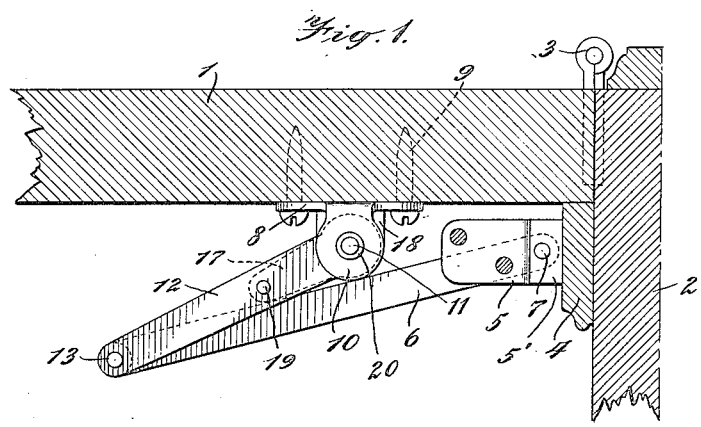
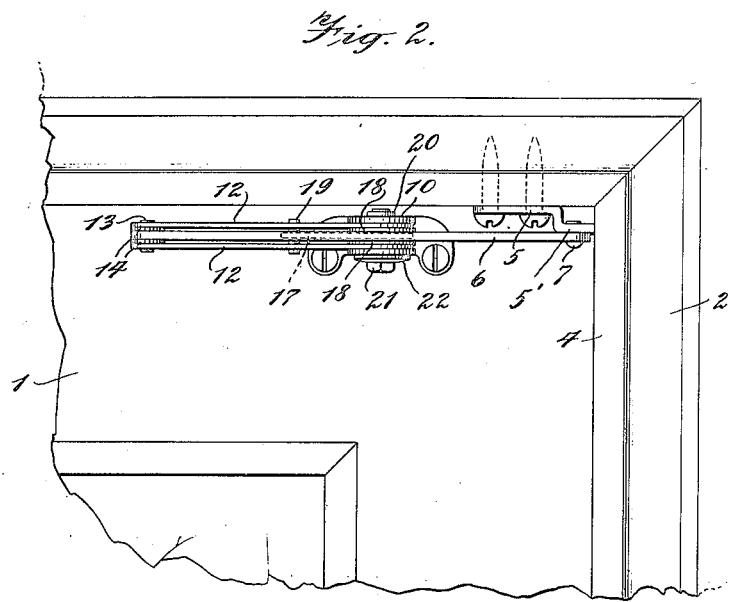
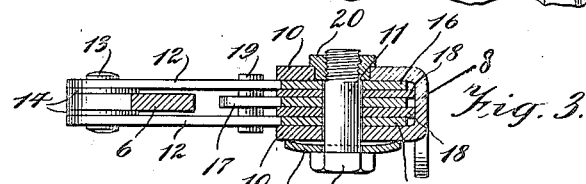
Inventor
Oscar C. Rixson
By his Attorneys

UNITED STATES PATENT OFFICE.

OSCAR C. RIXSON, OF NEW ROCHELLE, NEW YORK.

FRICTION-STAY.

1,225,359.  Specification of Letters Patent.  Patented May 8, 1917.

Application filed January 20, 1916. Serial No. 73,121.

*To all whom it may concern:*

Be it known that I, OSCAR C. RIXSON, a citizen of the United States, residing at New Rochelle, in the county of Westchester and State of New York, have invented certain new and useful Improvements in Friction-Stays, of which the following is a full, clear, and exact description.

This invention relates to friction stays such as are used with doors, transoms, casements or windows swinging inwardly and other swinging closures to hold them in a partially open position and to prevent them from rattling when they are in closed position.

As is well known, these stays consist of a plurality of rigid members pivoted together with the end members secured to the swinging closure and its frame, respectively. Two of the members are provided with surfaces in frictional contact which prevents any angular movement of these members and hence of the swinging closure, unless a determined force is applied thereto to overcome the friction; the force required may be varied by regulating the pressure between the friction surfaces and suitable means is employed for this purpose.

The object of the invention is to provide a friction stay of this character which will operate smoothly without sticking and yet will hold the swinging closure in any desired position except when moved by the application of a force of a determinable value; to provide a stay in which the friction between the surfaces in frictional contact remains constant, except when the pressure between the surfaces is positively adjusted to vary it; and to provide a stay which is of a simple construction and which may be manufactured at a comparatively low cost.

To accomplish these objects, a plurality of pairs of friction surfaces are provided upon each of two of the pivoted members which form a part of the system of linkage constituting the stay, which surfaces are maintained in frictional engagement and thus afford a relatively large frictional surface area which could not otherwise be provided unless the parts of the device were made of such large dimensions that the device would present a cumbersome and unsightly appearance. In the preferred construction, one of these two members is an anchor piece which is secured to the swinging closure and the other member is the rigid link which is pivotally connected thereto. The friction surfaces are maintained in frictional engagement by means which includes a resilient part which exerts its tension to press the friction surfaces together irrespective of whether the means employed with the resilient part becomes slightly loosened or the friction surfaces become worn after the device has been in operation for some time.

The invention will also be understood from the illustrated embodiment of the friction stay shown in the accompanying drawings and by the following description, the novel features of the stay being particularly pointed out in the appended claims.

In the accompanying drawings:

Figure 1 shows a stay constructed in accordance with the principles of my invention attached to a door or window, the sash of the window and the window frame being shown in section;

Fig. 2 is a side elevation of the friction stay shown in Fig. 1; and

Fig. 3 is an enlarged detail showing a section through the plurality of friction surfaces which hold the friction stay in any desired position.

As is the usual construction, the friction stay is composed of a plurality of rigid members which are pivoted together and form a system of linkage, the end members of which are adapted to be secured to a swinging closure and its frame, respectively. In the drawings, a door is shown which has been designated 1 and which is hinged to a frame or jamb 2 by means of suitable hinges, one of which is shown at 3. The door jamb or frame carries the usual strip 4 projecting from its inner face against which the door abuts when it is in its closed position. Secured to the under face of the top piece of the door jamb, is a plate 5 forming one of the end members of the system of linkage constituting the friction stay. This plate preferably abuts against the strip 4 which thus serves as a gage to properly position the device. The plate 5 is offset at one end to form a depending piece 5' to which a link 6 is pivoted by means of a rivet or pivot pin 7.

The other end member of the stay consists of an anchor piece 8 which is secured to the door or casement by means of screws 9, and is provided with ears or lugs 10 bent at right angles to the base plate which lugs form substantially circular friction disks. Pivotally mounted between these ears upon a bolt 11 which serves as a pivot pin, is a double link 12 consisting of two spaced bar plates which receive between them at their outer ends, the link 6, the links being pivoted together by a pin or rivet 13. Washers 14 are preferably interposed between the contacting surfaces of link 6 and the bar plates 12 of the double link. The ends of the bar plates 12 which surround the bolt 11 are enlarged to provide circular hubs 16 which are of the same diameter as the circular ears 10 and as shown in Fig. 3 are adapted to bear against the inner faces of these ears so that two pairs of friction surfaces are thus provided. Also surrounding the bolt 11 is a circular disk 17 having an arm or extension by means of which it is rigidly secured between two spaced bar plates 12 as by means of a pin 19. Interposed between the circular disk 17 and the circular hubs 16 are two disks 18, each of which have a square edge which abuts and rests upon the base of the anchor piece 8 to prevent them from turning. Each of the disks 18 has one face in frictional engagement with the intermediate disk 17, and another face in engagement with one of the hubs 16 so that in all six pairs of friction surfaces are thus provided, which surfaces are maintained in frictional engagement by bolt 11 which passes through a threaded bushing 20 carried by one of the ears. Interposed between the head 21 of the bolt and the ear is a cup-shaped washer 22 of resilient material so that when the bolt 21 is tightened to increase the pressure between the friction surfaces, the washer will be placed under tension and will always maintain the friction surfaces pressed together in frictional engagement even though the bolt 21 should loosen slightly or the friction surfaces become worn due to the repeated actuation of the stay. This resilient cup-shaped washer or an equivalent resilient member is therefore an important feature of the invention, since the friction stay becomes entirely inoperative if the friction surfaces slide too freely upon each other. It has also been found to be advantageous to locate the friction surfaces at the pivotal point between one of the links and an end member which is secured to the door frame or door, for in this way, the part or member which carries the adjusting bolt remains relatively stationary and there is no tendency for the bolt to become loosened as occurs where friction surfaces are positioned at the pivotal point between two links or members, both of which are movable during the operation of the device.

It may also be noted that by providing the plurality of friction surfaces in the manner described, a multiple disk brake is obtained and therefore the frictional engagement between the individual surfaces need not be as great as where only one pair of friction surfaces is employed, and the disadvantages of such a construction are thereby overcome: if the area of the friction surface is small it is necessary to materially increase the pressure between the friction surfaces to hold the members of the stay in the required position against inadvertent movement, the result of which is that the surfaces frequently stick and it is therefore impossible to operate the swinging closure smoothly and noiselessly; and if a single pair of friction surfaces are provided of sufficiently large surface area the parts of the device must be made of such large dimensions that the device will present a cumbersome and unsightly appearance. The manner in which the stay is used is obvious, for after it has been attached to the swinging closure and its frame as described, the bolt 11 is tightened until the desired amount of resistance to the angular movement of the link 12 is obtained, which will cause the swinging closure to remain in any position in which it is positively moved until it is again positively moved to a second position. Moreover, the resistance of the device against movement is sufficient to prevent a window or door from rattling when the same is in its closed position.

I claim:

1. In a friction stay for swinging closures, a plurality of rigid members pivotally connected together, one of the end members comprising an anchor piece, a pair of ears carried by said anchor piece, a bolt passing through said ears, a link comprising spaced bar plates pivoted upon said bolt between said ears, each of said bar plates having a portion of its outer surface engaging the inner surface of an ear, means mounted on said anchor piece and held against rotation with respect thereto surrounding said bolt and having surfaces engaging the inner surfaces of said bar plate, said bolt being adjustable to press said surfaces into frictional engagement.

2. In a friction stay for swinging closures, a plurality of rigid members pivotally connected together, one of the end members comprising an anchor piece, a pair of ears carried by said anchor piece, a bolt passing through said ears, a link comprising spaced bar plates pivoted upon said bolt between said ears, each of said bar plates having a part of its outer surface engaging the inner surface of an ear, a part mounted on said anchor piece surrounding said bolt and having its surfaces engaging the inner surfaces of said bar plates, said bolt being adjustable to press said surfaces into frictional engagement, and a spring washer on said bolt exerting its tension to hold said surfaces in frictional engagement.

3. In a friction stay for swinging closures, a plurality of rigid members pivotally connected together, one of the end members thereof comprising an anchor piece, a pair of ears carried by said anchor piece, a bolt passing through said ears, said member pivoted to said anchor piece comprising a link composed of spaced bar plates pivotally mounted on said bolt, a disk mounted between said bar plates and secured thereto, and disks carried by the anchor piece and held against rotation with respect thereto interposed between said disk carried by said bar plates and the inner surfaces of said bar plate, the outer surfaces of said bar plates engaging the inner surfaces of said ears, said bolt being adjustable to press said surfaces into frictional engagement.

4. In a friction stay for swinging closures, a plurality of rigid members pivotally connected together, one of the end members thereof comprising an anchor piece, a pair of ears carried by said anchor piece, a bolt passing through said ears, said member pivoted to said anchor piece comprising a link composed of spaced bar plates pivotally mounted on said bolt, a disk mounted between said bar plates and secured thereto, disks carried by the anchor piece and held against rotation with respect thereto interposed between said disk carried by said bar plates and the inner surfaces of said bar plate, the outer surfaces of said bar plate engaging the inner surfaces of said ears, said bolt being adjustable to press said surfaces into frictional engagement, and a spring washer on said bolt exerting its tension to maintain said surfaces in frictional engagement.

In witness whereof, I subscribe my signature, in the presence of two witnesses.

OSCAR C. RIXSON.

Witnesses:
　WALDO M. CHAPIN,
　MARY G. HART.